United States Patent [19]

Fukushima et al.

[11] Patent Number: 5,465,172
[45] Date of Patent: Nov. 7, 1995

[54] IMAGE READING APPARATUS

[75] Inventors: Shigenobu Fukushima, Toyokawa; Munehiro Nakatani, Toyohashi; Hideo Muramatsu, Shinshiro; Toshio Tsuboi, Okazaki; Hiroaki Hamano; Kanako Hamano, both of Hirakata, all of Japan

[73] Assignee: Minolta Camera Kabushiki Kaisha, Osaka, Japan

[21] Appl. No.: 121,665

[22] Filed: Sep. 15, 1993

Related U.S. Application Data

[63] Continuation of Ser. No. 667,605, Mar. 8, 1991, abandoned.

[30] Foreign Application Priority Data

| Mar. 12, 1990 | [JP] | Japan | 2-62433 |
| Mar. 12, 1990 | [JP] | Japan | 2-62434 |
| Mar. 12, 1990 | [JP] | Japan | 2-62435 |
| Mar. 12, 1990 | [JP] | Japan | 2-62436 |
| Mar. 12, 1990 | [JP] | Japan | 2-62437 |

[51] Int. Cl.$^6$ .................................................. H04N 1/42
[52] U.S. Cl. ........................... 358/498; 358/444; 358/404
[58] Field of Search .................................. 358/444, 404, 358/437, 498; 355/308, 319, 322

[56] References Cited

U.S. PATENT DOCUMENTS

| 4,581,656 | 4/1986 | Wada | 358/437 |
| 4,589,033 | 5/1986 | Burton et al. | 358/437 |
| 4,672,460 | 6/1987 | Tsuda | 358/437 |
| 4,712,139 | 12/1987 | Kato | 358/257 |
| 4,905,098 | 2/1990 | Sakata | 358/498 |
| 4,942,478 | 7/1990 | Yamagichi et al. | 358/437 |
| 4,975,783 | 12/1990 | Takaoka | 358/437 |
| 5,003,627 | 3/1991 | Wataya et al. | 355/308 |
| 5,030,991 | 7/1991 | Zaitsu et al. | 355/308 |
| 5,073,827 | 12/1991 | Nakajima | 358/437 |
| 5,105,283 | 4/1992 | Forest et al. | 358/444 |
| 5,126,787 | 6/1992 | Irie et al. | 355/308 |
| 5,148,286 | 9/1992 | Knodt et al. | 358/437 |

FOREIGN PATENT DOCUMENTS 61-50421 11/1986 Japan.

*Primary Examiner*—Scott A. Rogers
*Assistant Examiner*—Thomas L. Stoll
*Attorney, Agent, or Firm*—Willian Brinks Hofer Gilson & Lione

[57] ABSTRACT

An image reading apparatus for reading an image of an original while transporting the original from an original tray to an image reading position. When an original once read has to be read again due to some trouble, the original is automatically transported to an original tray provided upstream of the reading position so that the original can be automatically read again without operator intervention.

9 Claims, 17 Drawing Sheets

FIG.7

| SET A DESTINATION. | DISPLAY a |

| TRANSMISSION OF REMAINING ORIGINALS IS AUTOMATICALLY RESTARTED AFTER OPPOSITELY TRANSPORTING ORIGINAL. | DISPLAY b |

| MEMORY OVER CONDITION. TRANSMISSION IS MADE FIRST. WAIT FOR A WHILE. | DISPLAY c |

| TRANSMISSION FINISHED. | DISPLAY d |

| START TO READING REMAINING ORIGINALS. | DISPLAY e |

MEMORY MAP OF
CODE MEMORY

IMAGE READING APPARATUS

This application is a continuation of U.S. application Ser. No. 07/667,605, now abandoned.

BACKGROUND OF THE INVENTION

1. Field of the Invention

The present invention generally relates to an image reading apparatus and more particularly to the apparatus wherein a suitable processing is effected automatically when an abnormality of the apparatus takes place during image reading.

2. Description of the Related Art

Image reading apparatus have been conventionally provided. Image reading apparatus are employed for transmitting portions of facsimile and scanner printers, for example. In a facsimile, for example, an original is taken out from an original feeder, read by an original reader at a predetermined reading position, and the read original is held in a read original holder.

Conventional image reading apparatus have been configured as described above. In the case of facsimile, however, breaks of transmission sometimes occur because of occurrence of abnormal conditions such as network errors and memory over condition of a memory in the facsimile during original reading. The memory over condition means that the remaining quantity of a memory (usable region) become a predetermined quantity or less. In that case, read originals are all discharged to the read original holder once, and when transmitting the originals again when the network or the like is recovered, an operator had to return the read originals again to the original feeder.

Conventionally, the facsimile in which an original can be transported in an opposite direction for broadcast communication is described in Japanese Patent Publication No. 61-50421, for example. In the publication, originals are transported by the intention of an operator. Accordingly, facsimile in which an original is transported in an opposite direction in error occurrence having no connection with the intention of an operator as described above is not disclosed.

SUMMARY OF THE INVENTION

Accordingly, it is an object of the present invention that, in an image reading apparatus, when an abnormality occurs during original image reading, the apparatus automatically deals with the abnormality.

It is another object of the present invention to automatically read an original image again without an operator when an abnormality occurs during original image reading in an image reading apparatus.

It is still another object of the present invention to implement smooth transport of an original in the opposite direction in an image reading apparatus.

It is yet another object of the present invention to hold an original in a condition in which opposite transport is possible until the original is normally transmitted in an image reading apparatus having a transmitting function.

The above objects of. the present invention are achieved by an image reading apparatus including the following elements. That is, an image reading apparatus in accordance with the present invention includes a reader for sequentially reading a series of a plurality of original images, a memory for once storing all the image data sequentially read by the reader, a transmitter for transmitting the image data stored in the memory to another device, and a detector for detecting a lacking state of storage capacity of the memory. When a storage capacity lacking state of the memory is detected by the detector in the course of reading the series of the plurality of original images, the reading operation of the reader is interrupted. The controller controls the transmitter so that it transmits only image data corresponding to originals with image data for entire sheets of originals. After completion of transmission by the controller, the interrupted reading operation of the reader is automatically started again.

When the memory comes in a lacking state during image reading, only data corresponding to originals with image data for entire sheets of originals is transmitted first, and subsequently reading of the remaining originals is automatically started again. As a result, even an abnormality occurs during original image reading in an image reading apparatus, the apparatus can automatically deal with the abnormality.

In another aspect of the present invention, an image reading apparatus includes an original tray capable of carrying a plurality of originals, a discharge tray capable of discharging the plurality of originals, a transporting path for transporting the originals from the original tray to the discharge tray, a reader provided at a predetermined position in the transporting path for reading the original images, a first conveyor for transporting the originals placed on the original tray along the transporting path in the direction of the discharge tray one by one so that they pass the reader, a second conveyor for transporting the originals in a direction different from the transporting direction of the first conveyor, a memory for storing image data of the originals read by the reader, a transmitter for transmitting the image data in the memory to another device, a detector for detecting that there is no storage capacity of the memory, a controller for, when lack of storage capacity of the memory is detected by the detector in the course of reading original image, interrupting the reading operation, transmitting only image data corresponding to originals with complete image data for entire sheets of originals and transporting an original which was read halfway to a reading start point of the reader with the second conveyor, and a restarting device for automatically restarting reading the original image which has been interrupted. When the detector detects that there is no storage capacity of the memory left in the course of reading the original image, the reading operation by the reader is interrupted and only image data corresponding to originals with complete image data for entire sheets of the originals is first transmitted. The original which was being read is automatically transported oppositely to a reading start position of the reader by the second conveyor, and after completion of the previous transmission, reading of original images is automatically restarted by the reader. As a result, even if an abnormality takes place in which the storage capacity is used up during original image reading in an image reading apparatus, re-reading of original images is possible without an operator.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram showing contents displayed in the panel shown in FIG. 6.

DESCRIPTION OF THE PREFERRED EMBODIMENTS (1) First Embodiment

An embodiment of the present invention will be described below referring to the figures.

Figure 1:
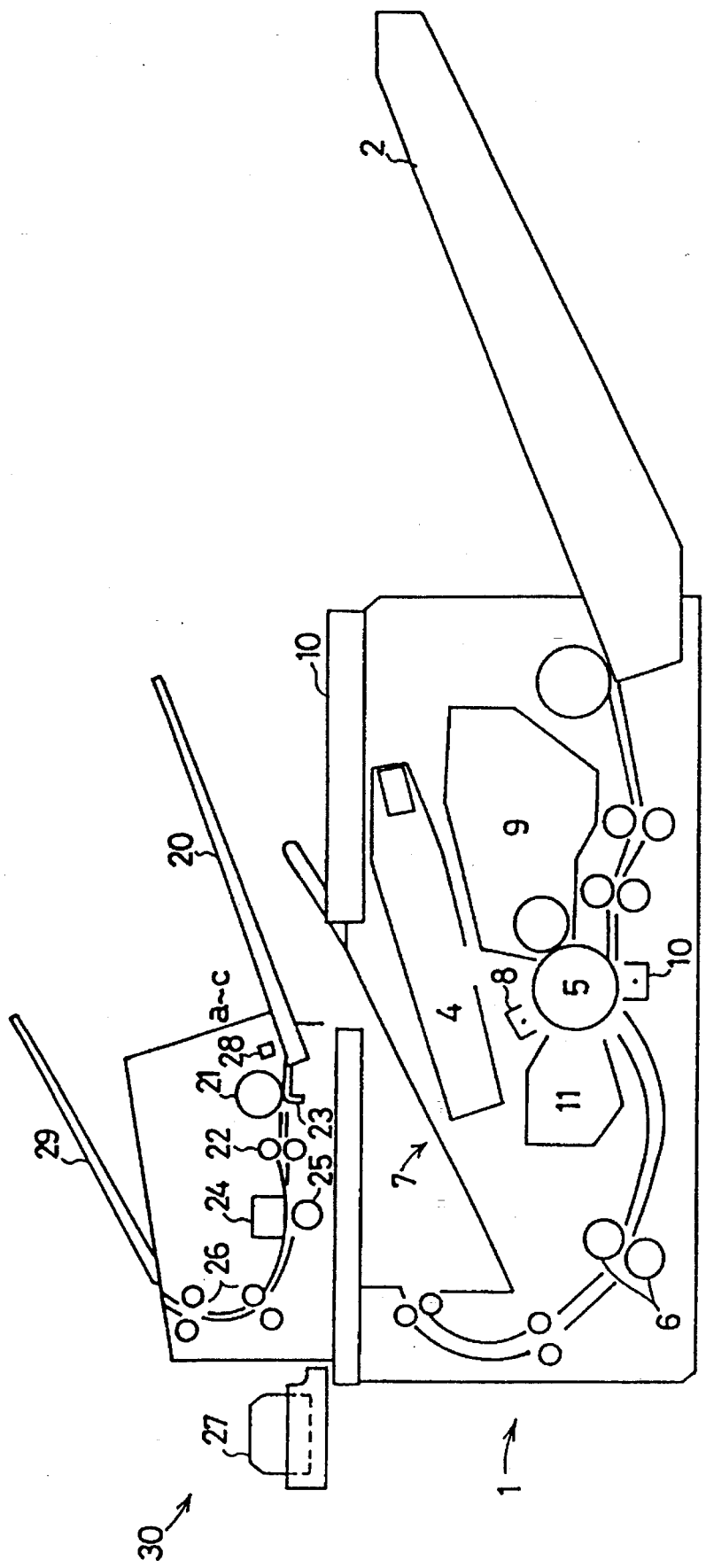
FIG. 1 is a section view of a facsimile apparatus to which the present invention is applied.

Referring to FIG. 1, a facsimile apparatus in accordance with the present invention includes a recorder 1 and a reader 30. The recorder 1 is a laser beam printer, whose operation will be briefly described below.

First, a photoreceptor drum 5 is evenly charged by a corona charger 8. Next, by irradiation of a laser beam of an optical system 4, an electrostatic latent image is formed on photoreceptor drum 5. The toner of a developing device 9 sticks to the electrostatic latent image. Meanwhile, cut paper are located in a paper feed cassette 2, which are fed to developing device 9 one by one by a roller or the like.

The toner sticking on the photoreceptor is transferred to the paper (cut paper) by a transfer charger 10. The image on the paper is fixed by a fixing device, and then the paper is discharged on a tray 7. The toner which did not stick to the paper is collected by a cleaner 11. With the above-described operation, a single printing operation is finished.

Next, operation of reader 30 will be described. Originals placed on an original tray 20 are detected by sensors 28a–28c and the leading edges are raised to a predetermined position by a push-up plate 23. Next, starting with the first original placed on the top, the originals are fed into the reader by pick-up roller 21. The originals are transported to an image sensor 24 which is a reading portion by rollers 22, 25, 26, where they are read as digital images. Subsequently, the originals are discharged into a discharge tray 29.

The facsimile apparatus includes a handset 27 for interface with a telephone line, a panel 10 for setting various operations for transmission/receipt and so forth.

Figure 2:
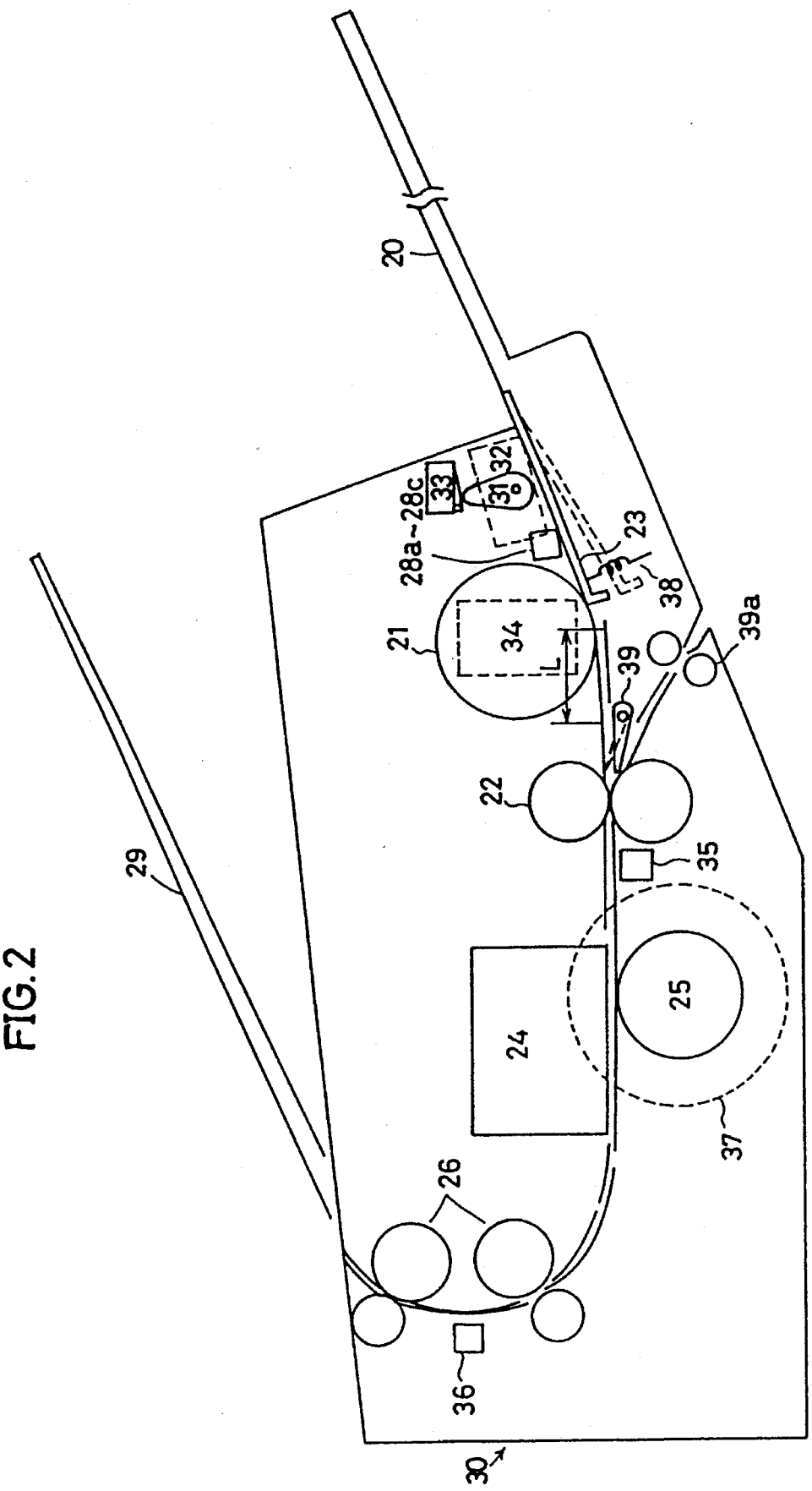
FIG. 2 is a detailed section view of a reader of a facsimile apparatus to which the present invention is applied.

FIG. 2 is a detailed sectional view of the reader 30 described with FIG. 1. Referring to FIG. 2, detailed operations of reader 30 will be described. Push-up plate 23 is moved up and down by rotation of a cam 31. All of cam 31, pick-up roller 21, and rollers 22, 25, 26 are driven by a motor 37 (shown by the broken line). Gears for driving force transmission for transmitting the power from the motor are not shown. The ON/OFF of clutches 32 and 34 (shown in a broken line) determines whether the driving force of motor 37 is transmitted or not to cam 31 and pick-up roller 21, respectively. That is, when clutch 32 is ON, push-up plate 23 is moved up and down against a spring 38, and when clutch 34 is ON, pick-up roller 21 is rotated. A micro switch 33 is provided for detecting upper/lower positions of push-up plate. A reflection type photoelectric switch 35 is provided for detecting whether an original has reached the reader including image sensor 24, and a reflection type photoelectric switch 36 is provided on the downstream side of the reader for detecting whether the original is discharged from the reader or not. The gears for power transmission (not shown) all gang together, so that an original is fed into the reader and automatically discharged into discharge tray 29 after the reading operation.

The operation in which an original which was once read by the reader is oppositely transported from discharge tray 29 toward original tray 20 is performed as described below. Push-up plate 23 is pushed down and an original on original tray 20 is moved downward. Subsequently, rollers 22, 25, 26 and pick-up roller 21 are reversed to oppositely transport the original toward original tray 20.

Instead of transporting the original to original tray 20, the transported original may be oppositely transported using a bypass. In this case, a switching claw 39 and a roller 39a shown in FIG. 2 are employed. Operations in that case will be specifically described next. In reading an original, switching claw 39 is located at a position shown by a solid line, and when oppositely transporting an original, the switching claw 39 is switched upward as shown by the broken line in the figure. As a result, when reversely transporting an original, the original is reversely transported until a leading edge of the original in reading reaches in front of roller 39a, and then roller 39a is normally rotated and the original is read again.

In the description below, a case of reversely transporting an original to original tray 20 will be described.

Figure 3:
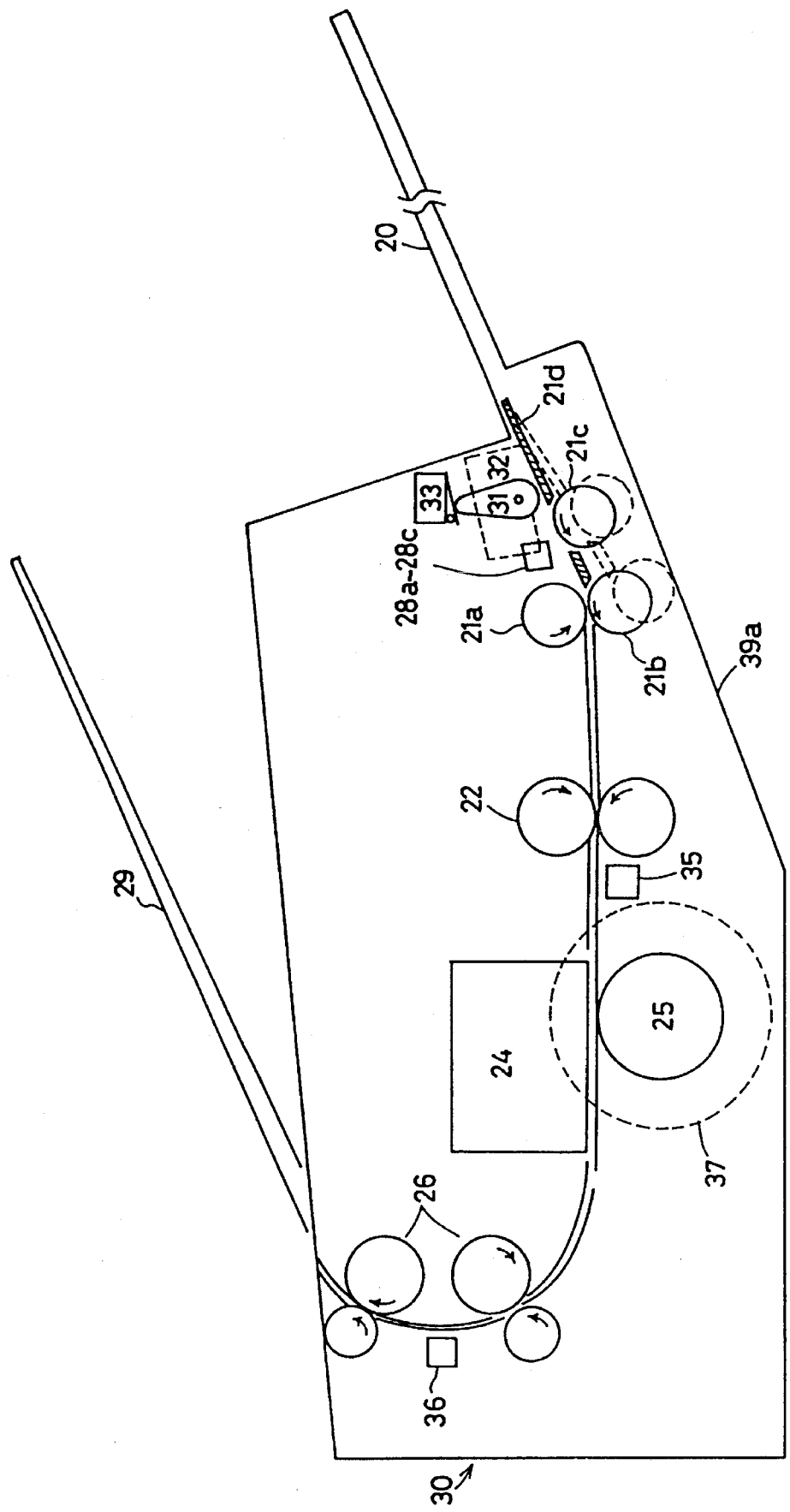
FIG. 3 is another embodiment of the apparatus in FIG. 2.

FIG. 3 is a detailed diagram showing another embodiment of a facsimile apparatus to which a reversely transporting apparatus for originals is attached. In FIG. 2, the originals are transported to the reader in a descending order, but the originals are transported in an ascending order in FIG. 3. Since no other points are different between FIG. 2 and FIG. 3, only different points from FIG. 2 only will be described below.

A facsimile apparatus having an original transporting device shown in FIG. 3 includes a bottom plate 21d of a paper stacker continuing to original tray 20 and having its other end provided up-and-down movable, feeding rollers 21b, 21c for transporting originals provided on bottom plate 21d of the paper stacker, and a roller 21a provided at a position facing to feeding roller 21b.

When an original is transported to the reader, feeding rollers 21a, 21b and 21c are rotated in the direction shown by the arrow, so that originals are fed into the reader in the order from the lower to the upper originals in the paper stacker.

On the other hand, when an original is oppositely transported toward original tray 20, the operation is performed as described below. First, when an original to be oppositely transported overlaps with another original on the paper stacker, in order to eliminate the overlapping, the original is once transported in the forward direction. Next, paper stacker bottom plate 21d is lowered to a position designated by the broken line in the figure. Under the conditions, an original read once is conversely transported from the reader and provided on originals which are not read yet on paper stacker bottom plate 21d.

Figure 4:
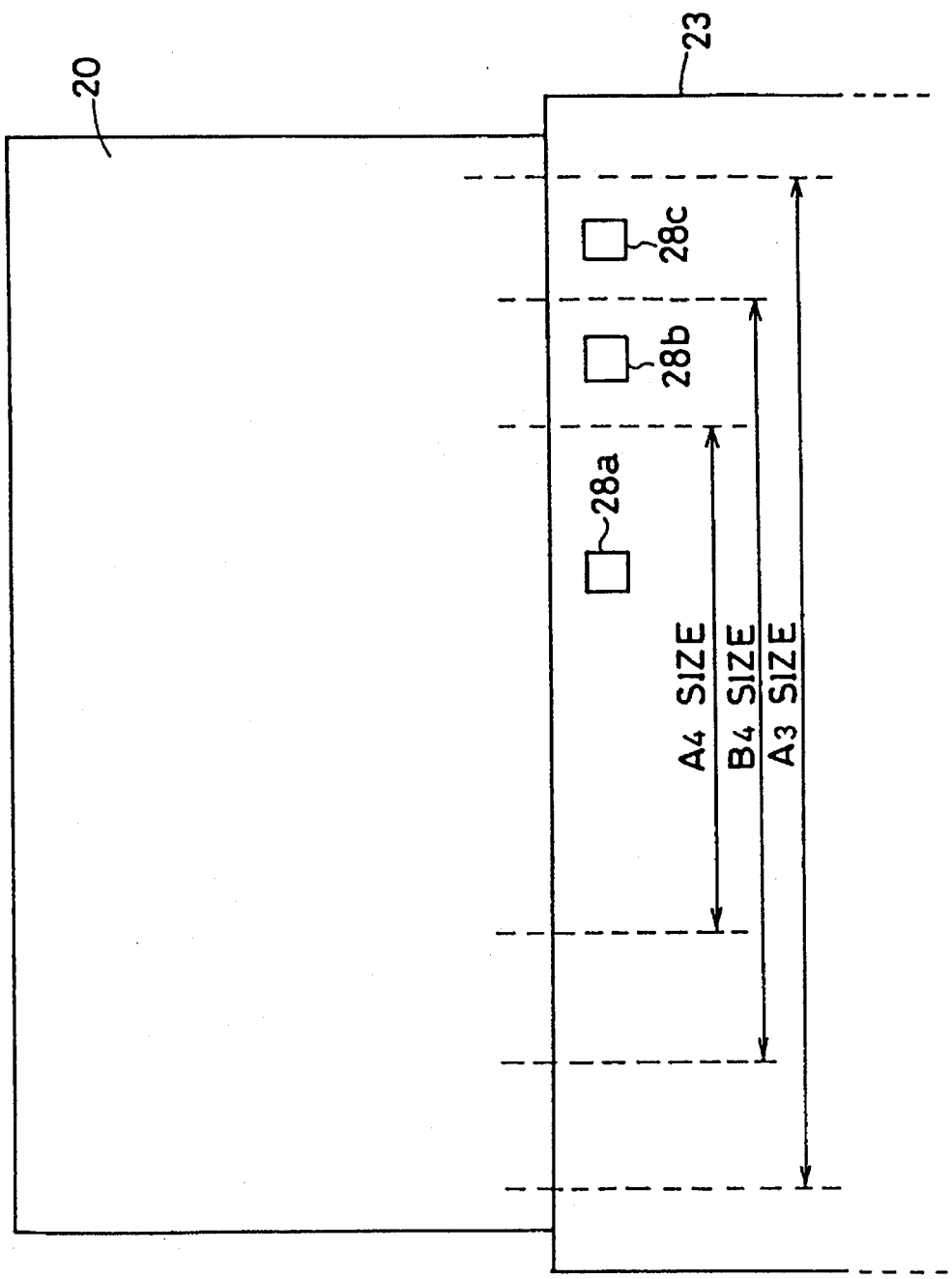
FIG. 4 is a plan view of the reader shown in FIG. 2.

FIG. 4 is a plan view seen from above original tray 20 of the facsimile apparatus shown in FIG. 2. Referring to FIG. 4, three sensors 28a, 28b and 28c are provided above push-up plate 23. Sensor 28a is a paper detecting sensor for detecting presence/absence of paper, and sensors 28b and 28c are paper size detecting sensors for detecting the size of paper.

In the present embodiment, paper are located in a manner that the center of original tray 20 is a reference line. As a result, the following relationship is obtained between sensor outputs and, presence/absence of paper and paper size.

TABLE

| Sensor Output | | | |
| --- | --- | --- | --- |
| 28a | 28b | 28c | STATE |
| OFF | OFF | OFF | NO PAPER |
| ON | OFF | OFF | A4 ORIGINAL |
| ON | ON | OFF | B4 ORIGINAL |
| ON | ON | ON | A3 ORIGINAL |

Figure 5:
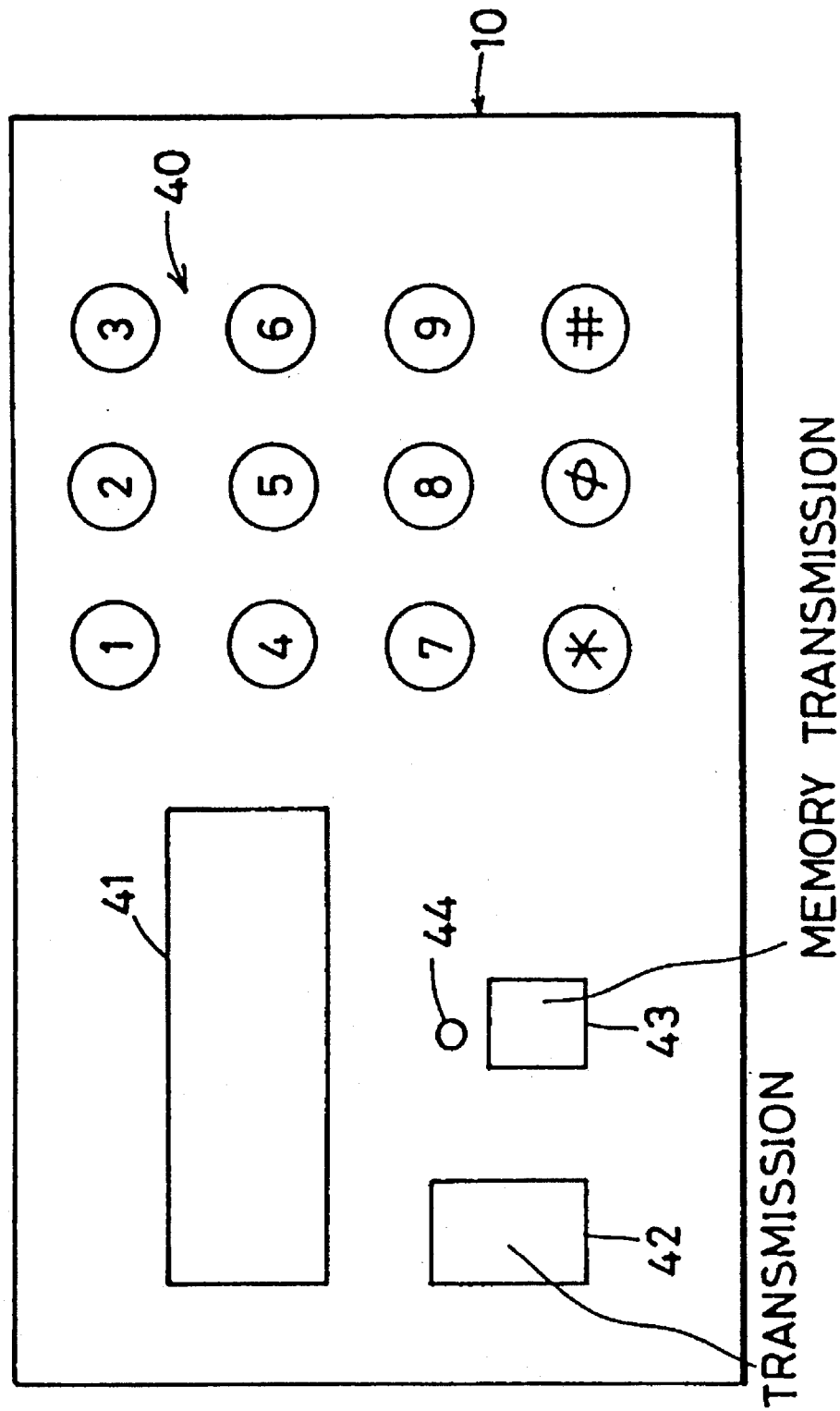
FIG. 5 is a schematic diagram of a panel of facsimile apparatus to which the present invention is applied.

FIG. 5 is a plan view showing an operation panel of a facsimile apparatus to which the present invention is applied. Referring to FIG. 5, panel 10 of the facsimile apparatus to which the present invention is applied includes ten keys 40, a liquid crystal panel 41 adjacent to ten keys 40, and operation keys 42 and 43 below liquid crystal panel 41. Ten keys 40 are employed for setting fax numbers or other settings (for example, setting of an area width of a no-transmission area described later). Liquid crystal panel 41 is employed for display of operation conditions of the facsimile apparatus or for instructions to an operator. Key 42 is employed for start of transmission operation of the facsimile. Key 43 is a key for switching between memory transmission and non-memory transmission, and an LED 44 is employed for display thereof.

Figure 6:
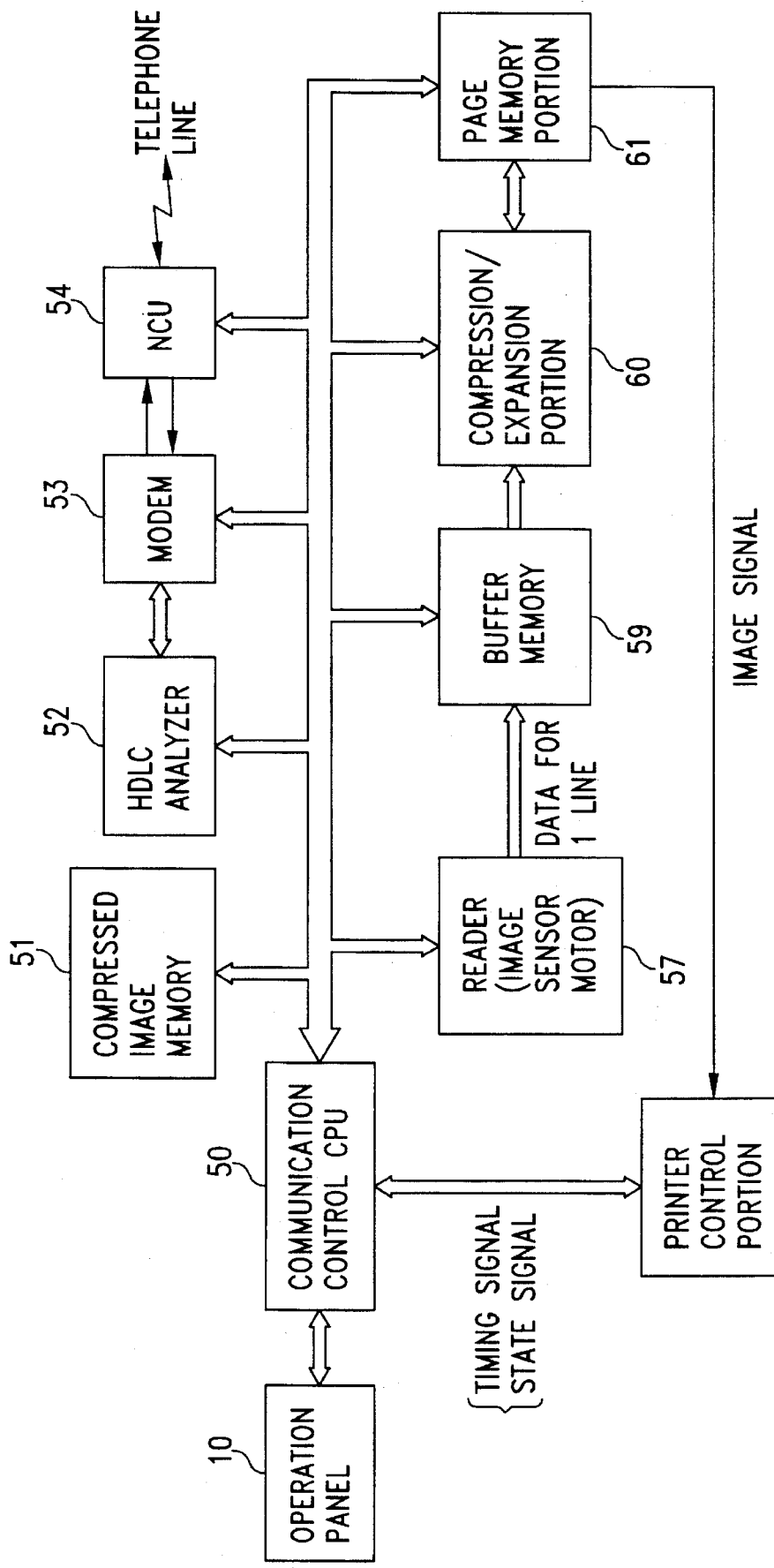
FIG. 6 is a block diagram of a controller of a facsimile to which the present invention is applied.

FIG. 6 is a block diagram of a controller of a facsimile apparatus to which the present invention is applied. Referring to FIG. 6, the controller of the facsimile includes a communication control CPU 50, an operation panel 10 and a printer controller 55. These CPU50, controller 55 and so forth are connected with communication lines for transmitting mode information and timing signal lines. A compression image memory 51, a HDLC (High Level Data Link Control Procedure) analyzing portion 52, a modem 53, a NCU (Network Control Unit) 54, a reader 57, a buffer memory 59, a compression/expansion portion 60 and a page memory portion 61 are connected to communication control CPU 50. The facsimile is connected to a telephone line through the NCU. Next, referring to FIG. 6, operation of the facsimile will be described.

First, the transmission operation will be described. The transmission operation includes (i) memory transmission and (ii) non-memory transmission.

(i) Memory Transmission

First, when an original is placed on an original tray, the original is detected by sensors 28a–28c of reader 57, and the information thereof is transmitted to communication control CPU 50. The communication control CPU 50 makes a display for requesting input of a facsimile number in a display of operation panel 10 (specific contents thereof will be described later). Upon input of the facsimile number, with a motor of reader 57 and image sensor 24 in synchronization with each other, image signals are read for every single line, and the data for a single line is transmitted to buffer memory 59. Simultaneously, the image data in buffer memory 59 is compressed by compression/expansion portion 60 and stored in compressed image memory 51.

When the image has been read, communication control CPU 50 calls a FAX on the receiving side employing modem 53, NCU 54 and a telephone line. When the line is connected, the compressed image data stored in compressed image memory 51 is transmitted to compression/expansion portion 60 to be expanded and stored in page memory portion 61 as the expanded image data. Next, the image signals are subjected to an automatic reduction process depending on the record size of the FAX on the receiving side, compressed by compression/expansion portion 60 according to the coding system of the FAX on the receiving side, and then stored in another area of compressed image memory 51 again. Such operations of expansion and compression are alternately performed for each single block unit including several lines.

While performing image signal compression corresponding to the receiving side capability, the obtained compressed data are processed by HDLC analyzer 52 according to the standard of HDLC, and sent out to the telephone line from modem 53 and NCU 54. When all the images have been transmitted, the line is disconnected according to a disconnecting procedure and the transmission is finished.

(ii) Non-Memory Transmission

The processes performed are similar to those of the memory transmission after originals are fed to the original tray and until a fax number is inputted. Subsequently, however, after dialing the destination to connect the line, the image data are read employing image sensor 24 and the motor of reader 57, which are stored in buffer memory 59. Simultaneously, depending on the record size and the compression system of the destination, the image signals are converted into compressed data, and the data are transmitted to the telephone line employing HDLC analyzer 52, modem 53 and NCU 54 through compressed image memory 51.

Since operations in receipt are not so relevant to the present invention, only an outline thereof will be given. Operations are performed as described below on the receiving side FAX called through the telephone line. After connecting the line, the compressed image data are expanded and stored in page memory portion 61 as actual image data. Simultaneously, the data are transmitted to printer control portion 55, and recording is performed in synchronization with recording operation by a controller provided in the printer.

Next, factors of breaks of transmitting data of an original will be described. Breaks of the transmission due to jam or the like other than the factors described here are possible. In such cases, however, an operator is required and, therefore, a description thereof is omitted here.

First, errors when connecting a line will be described. They occur mainly because of defective condition of the lines, dialing to an uncommunicatable apparatus and so on. In this case, the first original is transported to a reading sensor portion, and preferably is returned to the original tray 20 in occurrence of an error. Next, an error in image data transmission is possible. Inferior line conditions, defects on the receiving side (no paper, memory over, etc.) are possible. In this case, it is not known to which portion of data of an original being read has been actually transmitted. Accordingly, it has to be read and transmitted again, so that the original is preferably returned to the original tray 20.

At the last, errors in line disconnection will be described. As a cause, inferior conditions of the network is possible. Since line disconnection takes a long time, the final original has been discharged in discharge tray 29 when error occurrence is detected in a conventional case. When a network error occurs when transmitting the final original, however, the last page should be transmitted again, so the original is preferably returned to the original tray 20.

In addition to this, a case where a memory is filled up in reading in memory transmission is also possible. In this case, after transmitting the data stored in the memory, reading of the data at the next reading position may be started, or an original read halfway may be transported in an opposite direction and read again.

Among various errors described above, in order to cope with the memory error in which the memory is filled up in memory transmission, the facsimile may be configured so that the data are not lost electrically. In this case, the facsimile apparatus includes a memory having sufficient capacity as buffer memory 59, for example. Even after the operation of reader 57 is stopped because of error occurrence, the image information is held in buffer memory 59. That is, by leaving a margin in the synchronized processing between the reading system and the data compression portion, recovery from a memory error is made possible. In such a case, an original does not necessarily have to be oppositely transported, and a procedure of occurrence of a memory error→transmitting data already read→transmitting the read original can be taken.

Next, referring to FIG. 7, display contents of liquid crystal panel 41 shown in FIG. 5 will be described. In liquid crystal panel 41, the displays a–e shown in FIG. 7 are displayed according to operations of the facsimile. Specific situations for implementing respective displays will be described in the flow charts which will be described later.

Figure 8:
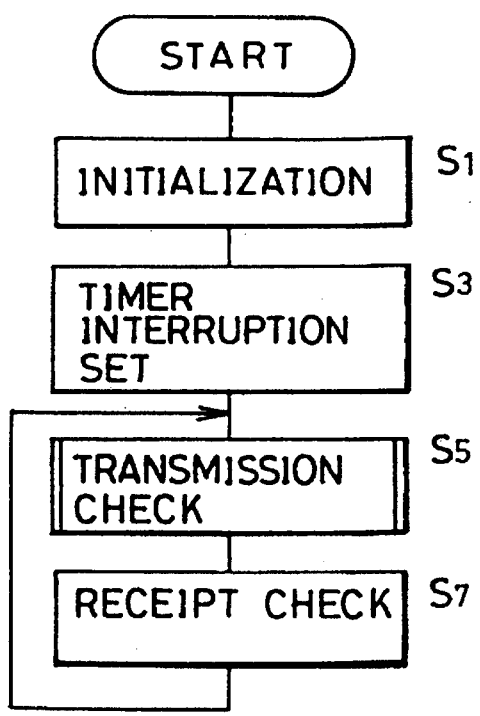
FIGS. 8 and 9 are schematic flow charts of the communication control CPU.
Figure 9:
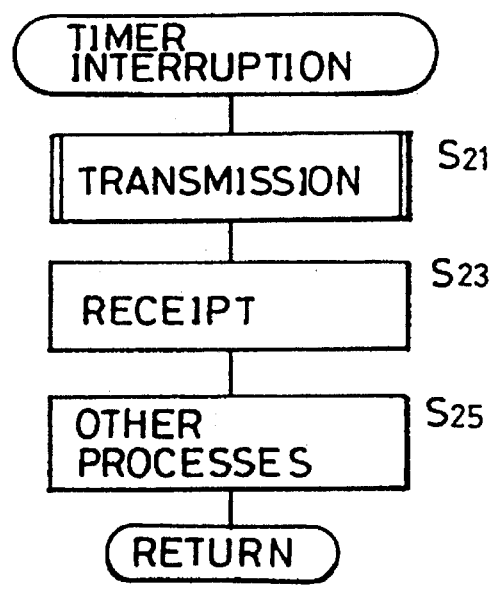

FIGS. 8 and 9 are flow charts showing schematic control of communication control CPU 50. Referring to FIG. 8, a flow chart of the communication control CPU 50 will be described. First, in step S1 (hereinafter, "step" is omitted), initialization of a register, various input/output ports, various flags and the like are made. Next, in S3, a timer interruption for periodically calling an interruption subroutine shown in FIG. 9 is set. S5 and S7 are check routines for desirably operating each sequence in an interruption service routine (for example, to perform transmission when it is needed). After processing is finished to S7, the program returns to S5 again and the same check is repeated. The transmission check routine S5 will be described later in detail, but the receiving check routine S7 is not so relevant to the present invention, so that the description thereof is not made.

FIG. 9 is a subroutine of a timer interruption set in S3 of FIG. 8. The subroutine is formed of two routines, that is, a transmission routine S21 and a receipt routine S23. Details of transmission routine S21 will be described later. Receiving operations of the receipt routine S23 is not so relevant to the present invention, so that the description thereof is omitted herein.

Figure 10:
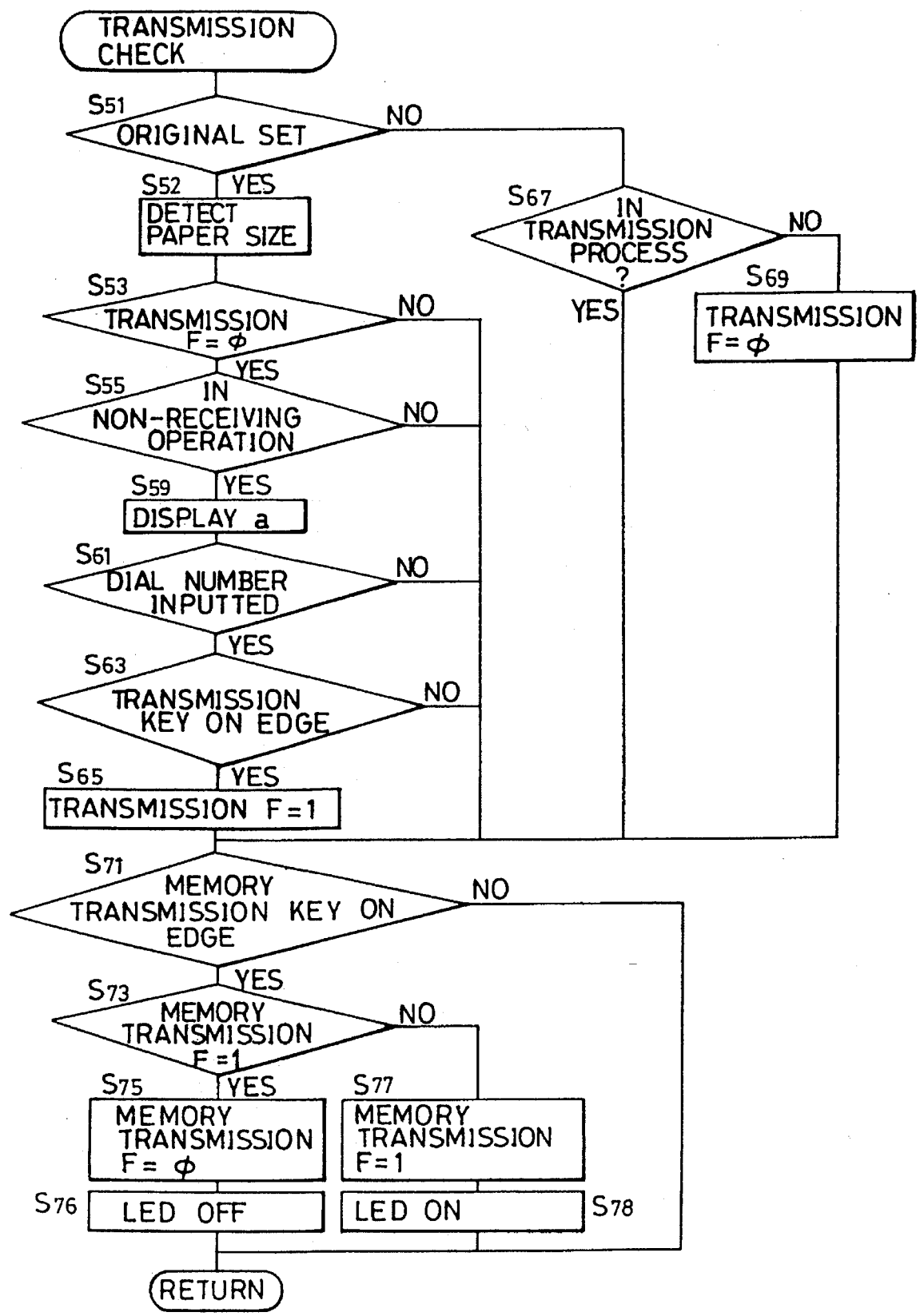
FIG. 10 is a flow chart showing a transmission check subroutine.

FIG. 10 is a flow chart showing the transmission check routine described in S5 of FIG. 8. Referring to FIG. 10, details of the transmission check subroutine will be described.

First, in S51, detection of set condition of an original is performed. When an original is set, the program proceeds to S59 on conditions that the size of the original is detected, a transmission flag is reset, and the facsimile is not being receiving in S52, S53, and S55. Not only when the facsimile apparatus is in transmitting operation, but also when an original is discharged, the transmission flag is set at 1. Accordingly, strictly speaking, a transmission flag set at 1 has a wider meaning than that the facsimile apparatus is now being transmitting.

Next, in S59, the display a described in FIG. 7 is made, and an operator is requested to input a dial number. Then, upon input of the dial number, the program proceeds to S63.

In S63, an ON edge of a transmission key is detected, and when an ON edge is detected, the program proceeds to S65 and a transmission flag is set. If an original is not set in S51, the program proceeds to S67, and a determination is made as to whether the facsimile apparatus is in a transmission operation or not. If the facsimile apparatus is not in a transmission operation in S67, a transmission flag is reset in S69. The transmission flag is reset in S69 in this way because of the following reasons. When a memory comes in a memory over condition in reading an original in the memory transmission, for example, the image data is first transmitted to the network. As a result, an operator may take out the original without waiting for the next transmission in some cases. In such cases, it is intended that the apparatus is recovered from transmission operation after completion of transmission of image data to the destination.

S71–S78 are for switching operation of memory transmission or not. Every time the memory transmission key 43 is depressed in S71, in S73, a check is made to see if memory transmission is implemented or not, the content is inverted, and a display is made in LED 44 in S76 or S78.

Figure 11A:
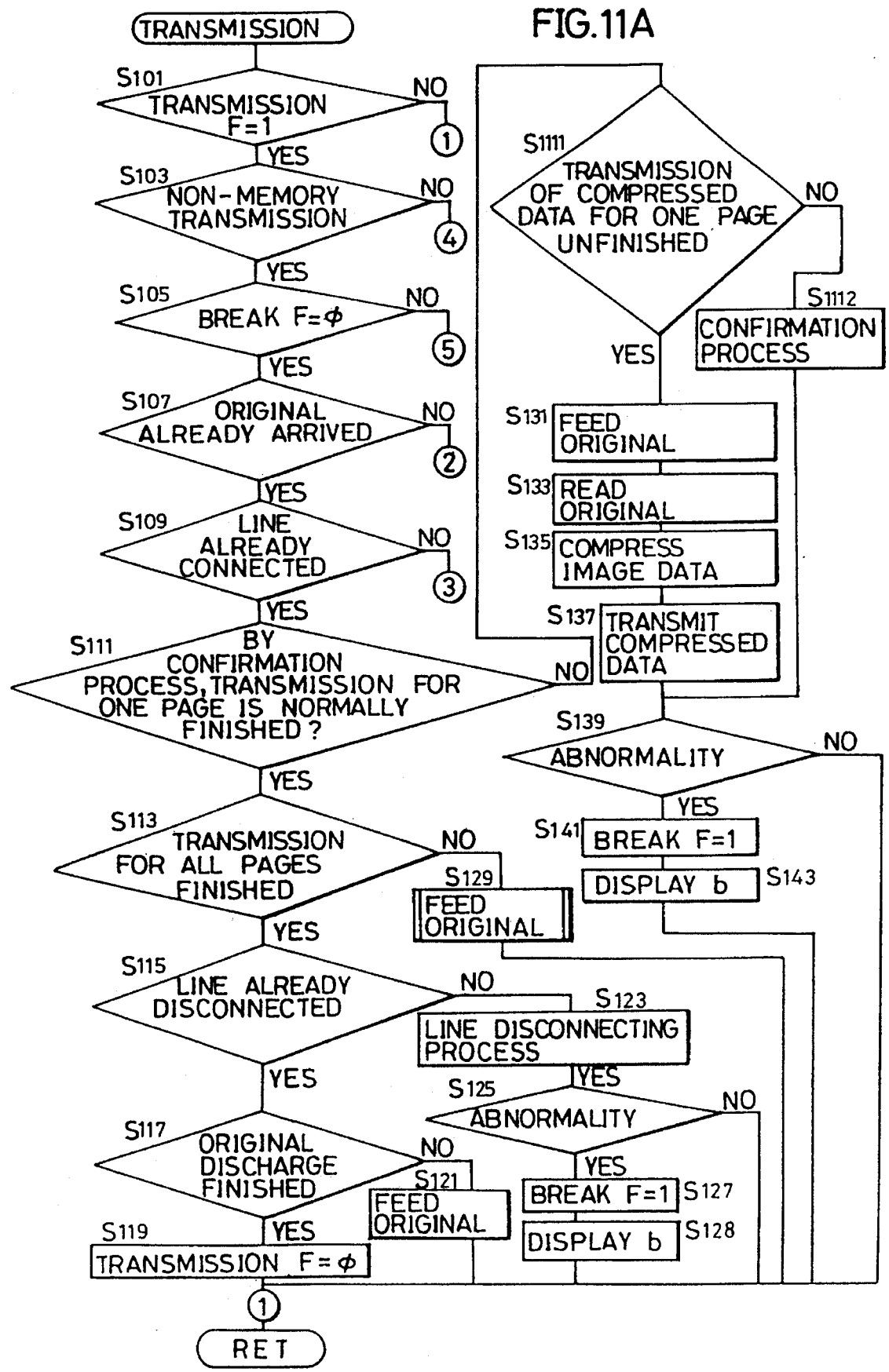
FIGS. 11A, 11B and 11C are flow charts showing a transmission subroutine.
Figure 11B:
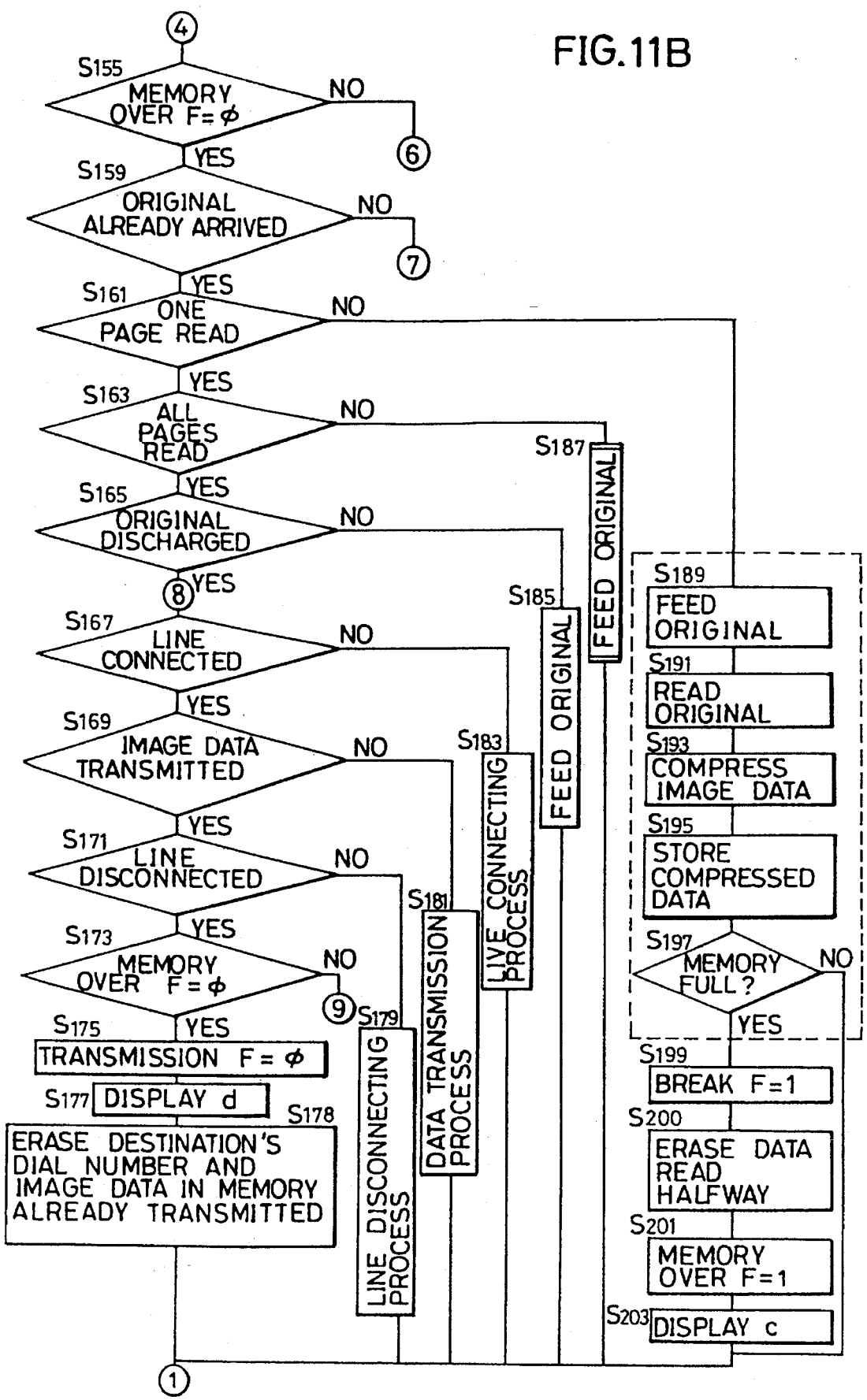
Figure 11C:
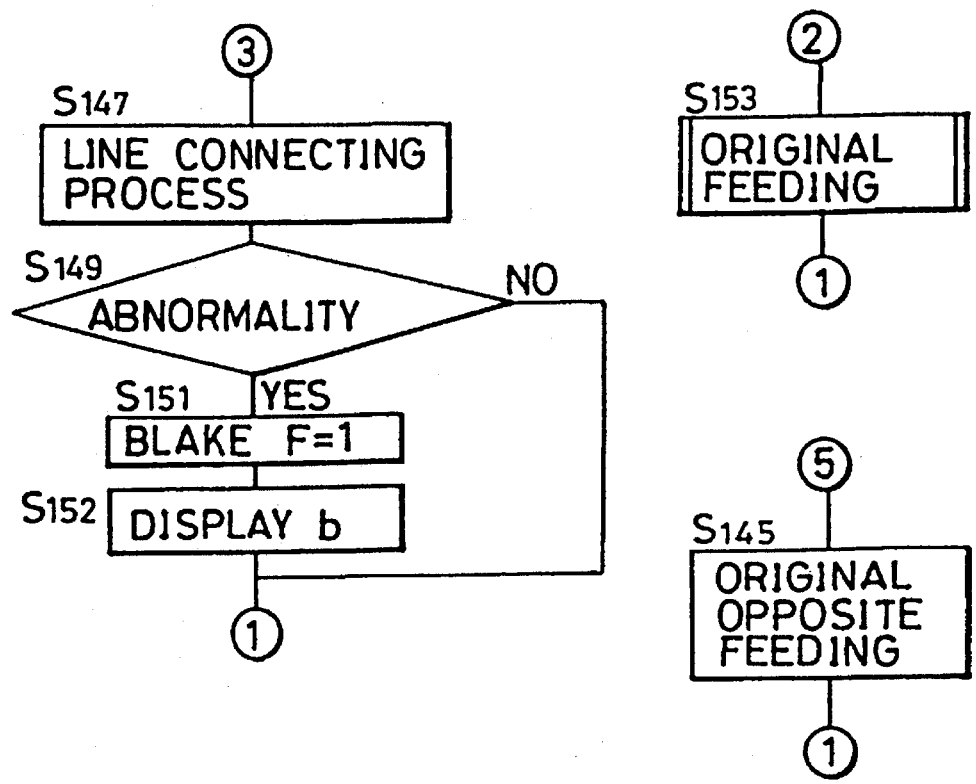
Figure 11C:
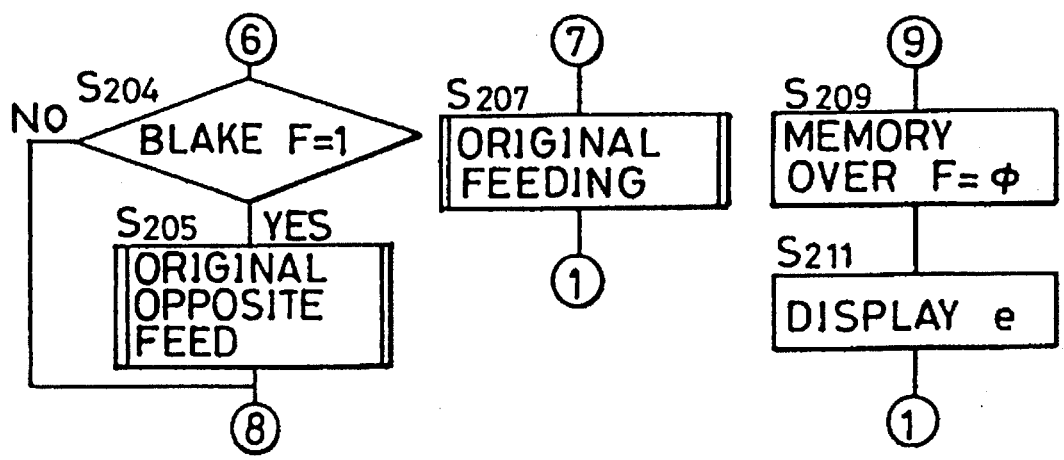

FIGS. 11A–11C are flow charts showing the transmission process routine described in S21 of FIG. 9.

Referring to FIGS. 11A and 11C, the process of the non-memory transmission is described. First, in S101, a transmission flag is checked, and when the flag is set at 1, the program proceeds to the flow below. A determination is made as to whether the memory transmission is to be implemented or not in S103, and the program branches to S105 and S155.

The flow below the S105 shows a process in a non-memory transmission. A break flag is checked in S105. The break flag is set to 1 for a trouble on the network when degradation of the network conditions, a defect on the receiving side or the like occurs. This flag is also set for other causes in the memory transmission. When the break flag is set, the program proceeds to the flow after S145, and a reverse transport process is performed so that an original is returned to original tray 20. It will be described in detail later referring to FIG. 13.

When the break flag is reset in S105, a check is made to see which transmission operation is being performed at the present time in S107–S117 and the program branches according to the respective transmission operations. First, until the head original reaches image sensor 24, feeding of an original is performed in S153. The operation will be described in detail later referring to FIG. 12.

Next, until line connection is completed, a connecting process of the line is performed in the flow after S147. If an abnormality occurs, the break flag is set at 1 in S151. The break flag is set here in order to return an original to original tray 20 to enable an operator to take out the original. If the operator takes out the original in such a case, the transmission flag is reset in S67 and S69 in the transmission check routine described in FIG. 10.

Next, in S111, a determination is made as to whether transmission of an original for one page is normally finished or not by the confirmation process in S1112 described later. When the confirmation process is not completed, in S1111, a determination is made as to whether transmission of image data for one page is completed or not. When the transmission is completed in S1111, a confirmation process is carried out in S1112, The confirmation process means to transmit a signal indicating completion of image data transmission to an apparatus at a transmission destination and also to receive a signal indicating completion of normal receipt from the apparatus at the transmission destination.

Next, until completion of image data transmission for one page in S1111, in the flow after S131, each of the processes of transport of an original by a motor (S131), reading of original image data (S133), compression of read original image data (S135), and transmission of the compressed data (S137) is performed.

If an abnormality occurs such as network disconnection, the program proceeds from S139 to S141, a break flag is set, and the display b described in FIG. 7 is made. This enables reverse transport of an original and retransmission by an operator.

In this way, when transmission of image data for one page is normally finished (normal receipt by a receiving apparatus on the other party), and also transmission for all the pages is not finished in S113, the program proceeds to S129 and the next original is fed. At this time, simultaneously, an already transmitted original is discharged. By this operation, until transmission of a sheet of original is finished, an original remains in a transport path, and as a result, the original is held in a condition which enables reverse transport. If transmission for all the pages is completed in S113, the program proceeds to S115 and a check is made to see if the line disconnecting process is finished or not. If the line is not disconnected, the line disconnecting process is performed in S123. If an abnormality occurs here, a break flag is set to 1 in S127, and the display b shown in FIG. 7 is made (S128). Thus, after occurrence of the abnormality, the program proceeds from S105 to S145, so a process of reversely discharging an original is performed.

In this flow chart, it is presumed that when an upper step is once passed in YES, the program proceeds to lower steps. That is, if the line connection is once implemented in S109, a determination as to whether line disconnection has already implemented or not is made in S115 via S111 and S113.

Finally, after completion of the line disconnecting process, an original discharge operation is started in the flow after S117. The original discharge operation is not started during the line disconnecting process because reverse transport of an original is required when an abnormal condition occurs during the disconnecting process. As described above, an original is held in a path capable of opposite transport until the line disconnection process is finished. Upon completion of discharge of the original, the program proceeds from S117 to S119, and the transmission flag is reset to finish the non-memory transmitting operation.

By processing originals as described above, the originals are held at a position at which reverse transport is possible until the disconnecting process is finished with respect to all the originals including the last original, or until they have been normally transmitted.

Next, referring to FIGS. 11B and 11C, processings in the memory transmission will be described. When it is determined that the memory transmission is set in S103 of FIG. 11A, the program proceeds to the flow after S155.

First, in S155, a memory over flag is checked. This flag is a flag set when a compression memory 51 is filled up in original reading. This flag will be described in detail later. When the memory over flag is 0 in S155, the program proceeds to S159 to control reading operation. First, in S207, an original is fed until the head of the original reaches image sensor 24. After the original reaches image sensor 24, the following processes are performed for each original; feeding of an original until one page has been read (S189), reading the original by image sensor 24 (S191), compression of the read image data (S193), and storage of the compressed image data (S195). If a memory comes in the condition of memory over (YES in S197), a break flag and a memory over flag are set in S199 and S201. Then, the display c shown in FIG. 7 is made in S203 to inform an operator that, the image data is transmitted and that the condition of memory lacking will be solved. Also, in S200, the image data of the page interrupted in the course of reading is erased. Then, while performing transmitting operation, the original read halfway is oppositely transported to original tray 20.

That is, when the memory is in the memory over condition as described above, the program proceeds to S204 from S155 to check a condition of the break flag. When the break flag is set to 1, since opposite transport of an original is not finished, after discharge of an original in S205, compressed image data are transmit to the other party in the flow after S167. The transmission operations will be described later in detail.

When reading of an original for one page is finished in S161, the program proceeds from S163 to S187 until feeding of the next original is finished. Upon arrival of the original, in S163, similar operations are repeated until reading of originals for all the pages are finished. When reading of originals for all the pages are completed, the last original is discharged (S180). Next, the compressed image data of the read originals are transmitted in S167–S183.

First, line connecting process is performed in S167 and S183, and next, compressed image data are transmitted in S169 and S181, and line disconnecting process is performed in S171 and S179 when transmitting of the compressed image data is finished. In S173, a check is made to see if it is transmitting operation in memory over condition of a memory or not. When a determination is made that it is transmitting operation in the memory over condition of the memory in S173, the program proceeds to S209, the memory over flag is reset, and an operator is informed of restarting of reading operation (S211). When it is not the condition of memory over of the memory in S173, the program proceeds to S175, a transmission flag is reset, and the display d shown in FIG. 7 is made in S177. Next, the dial number of transmission destination and the data in the image memory already transmitted are erased in S178, and the transmission operation is finished. Here, since the other partie's dial number is held until S178, an operator does not have to input the dial number when dialing again.

In the above embodiment, as shown in S200, in the memory over condition, image data of originals already are read first transmitted and image data of the original not completely read set is erased. Instead of this, without oppositely transporting the original, the image reading may be restarted. That is, after detection of the memory over in S197 of FIG. 11B, the process of S200 may not be carried out, that is, the data in a memory may not be erased in the middle of reading. The process of original opposite transport performed next (S205) is not performed either. Instead of these processes, an address on a memory, where image data of a head of a line which is standing still at a read position at the present time (on the reading starting side) should be stored, is saved in a register or the like.

After transmitting the stored image data of the original, reading is started. In this case, the starting point of reading is the line standing still at the present time at the reading position, and a writing starting address for the memory is the address saved previously.

By performing such processes, disadvantages such as loss of image data of a line standing still at a reading position can be avoided.

Figure 12:
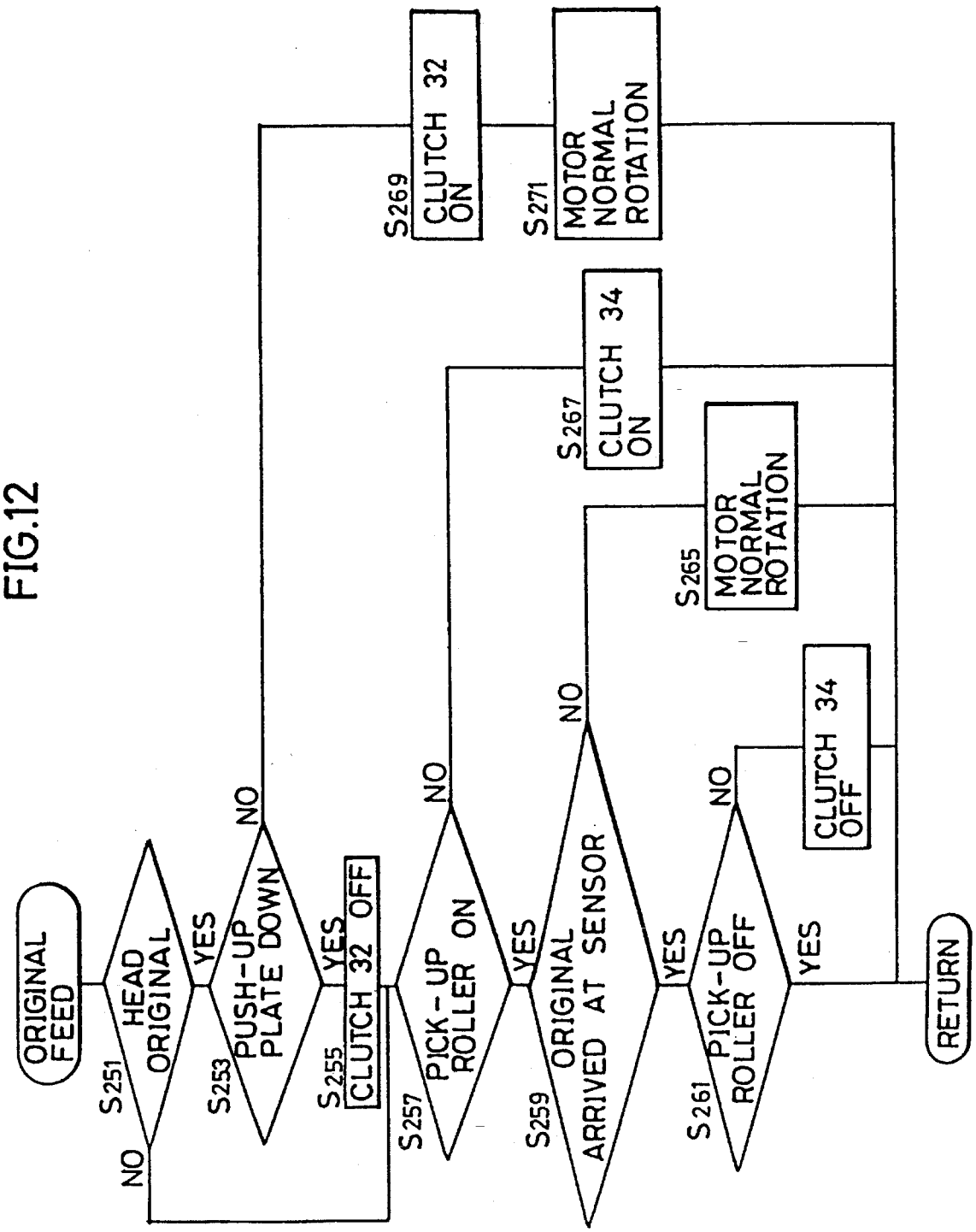
FIG. 12 is a flow chart for describing a subroutine of original feeding.

FIG. 12 is a flow chart showing a subroutine for feeding originals. Referring to FIG. 12, the subroutine for feeding originals will be described. First, in S251, if the original is a head original, push-up plate 23 is lowered. That is, until push-up plate is lowered in S253, clutch 32 is ON (S269), and the motor is normally rotated (S271). As a result, push-up plate 23 is lowered, and clutch 32 is turned OFF upon completion thereof (S255). Next, if pick-up roller 21 is not ON, clutch 34 is turned ON (S267), and the motor is normally rotated to transport the original in S265 until the original reaches the reading portion of reading sensor 24 in S259. Upon finish of transport of the original, if pick-up roller 21 is not OFF in S261, clutch 34 is turned OFF (S263).

Figure 13:
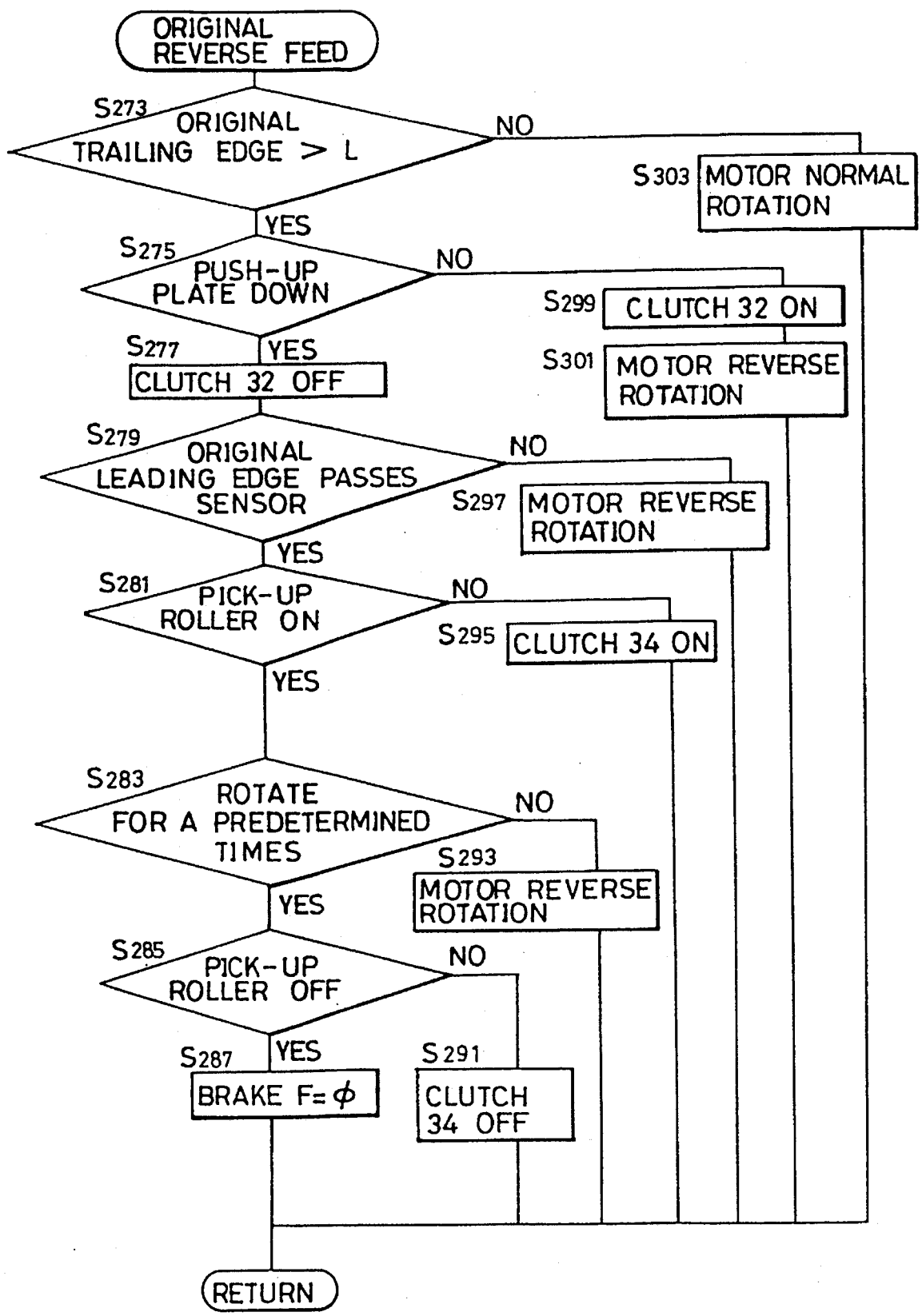
FIG. 13 is a flow chart showing an original opposite transportation subroutine.

FIG. 13 is a flow chart for reversely transporting an original. Referring to FIG. 13, a process sequence for oppositely transporting an original in accordance with the present invention will be described. First, in S273, a check is made to see if a trailing edge of an original is away from pick-up roller 21 by "L" or more on the side of reading sensor 24. The dimension of the "L" is shown in FIG. 2. Such a check is made because of the following reasons. It is for detecting whether a trailing edge of an original reaches push-up plate 23 before push-up plate 23 is completely lowered when motor 37 is oppositely rotated in order to lower push-up plate 23. In such a case, after the original is once transported in the distance of "L" or more in a forward direction from the upstream to the downstream, push-up plate 23 is lowered. That is, if it is NO in S273, the motor is normally rotated in S303, and then the program proceeds to S275. Next, in order to lower push-up plate 23, clutch 32 is turned ON in S299 until push-plate 23 is completely lowered in S275, and the motor is oppositely rotated in S301. When push-plate 23 is completely lowered, clutch 32 is turned OFF in S277.

Next, until a leading edge of an original passes photoelectric switch 35, pick-up roller 21 is OFF, and the original is reversely transported (S297). After a leading edge of an original passes photoelectric switch 35 (YES in S297), if pick-up roller 21 is not ON in S281, clutch 34 is turned ON (S295), and pick-up roller 21 is oppositely rotated for a predetermined times to reversely transport the original (S293). Then, if pick-up roller 21 is ON, clutch 34 is turned OFF in S291, and after a break flag is reset to 0 in S287, the reverse transporting process of an original is finished.

The break flag is reset in S287. By this, regardless of the transmitting mode, reading is automatically restarted. The operation of reversely transporting an original to original tray 20 is now finished.

In the present invention, the transmission flag remains 1 even at the end of opposite transport, so that transmitting (including reading) operation is automatically restarted for the remaining originals. It is also possible to give a right of determining whether the remaining originals should be transmitted or not to an operator. Such a method is effective when an operator knows the situations where a line error will certainly occur even the original is transmitted again, for example. In this case, a sequence of resetting a transmission flag is added after S287, and it is displayed in the display b and the display e shown in FIG. 7 that it is required to depress a transmission key when restarting.

Furthermore, in FIG. 10, when the facsimile is in a condition where the display b or the display e is made, implementing the program so that it jumps to S63 after S55 allows restating of transmitting operation of remaining originals only with a transmission key without inputting the dial number (2) Second Embodiment Next, the second embodiment of the present invention will be described. In the second embodiment of the present invention, the memory over condition of the facsimile is predicted in advance. Since the second embodiment is almost similar to the first embodiment, only different portions from the first embodiment will be described here.

Figure 14:
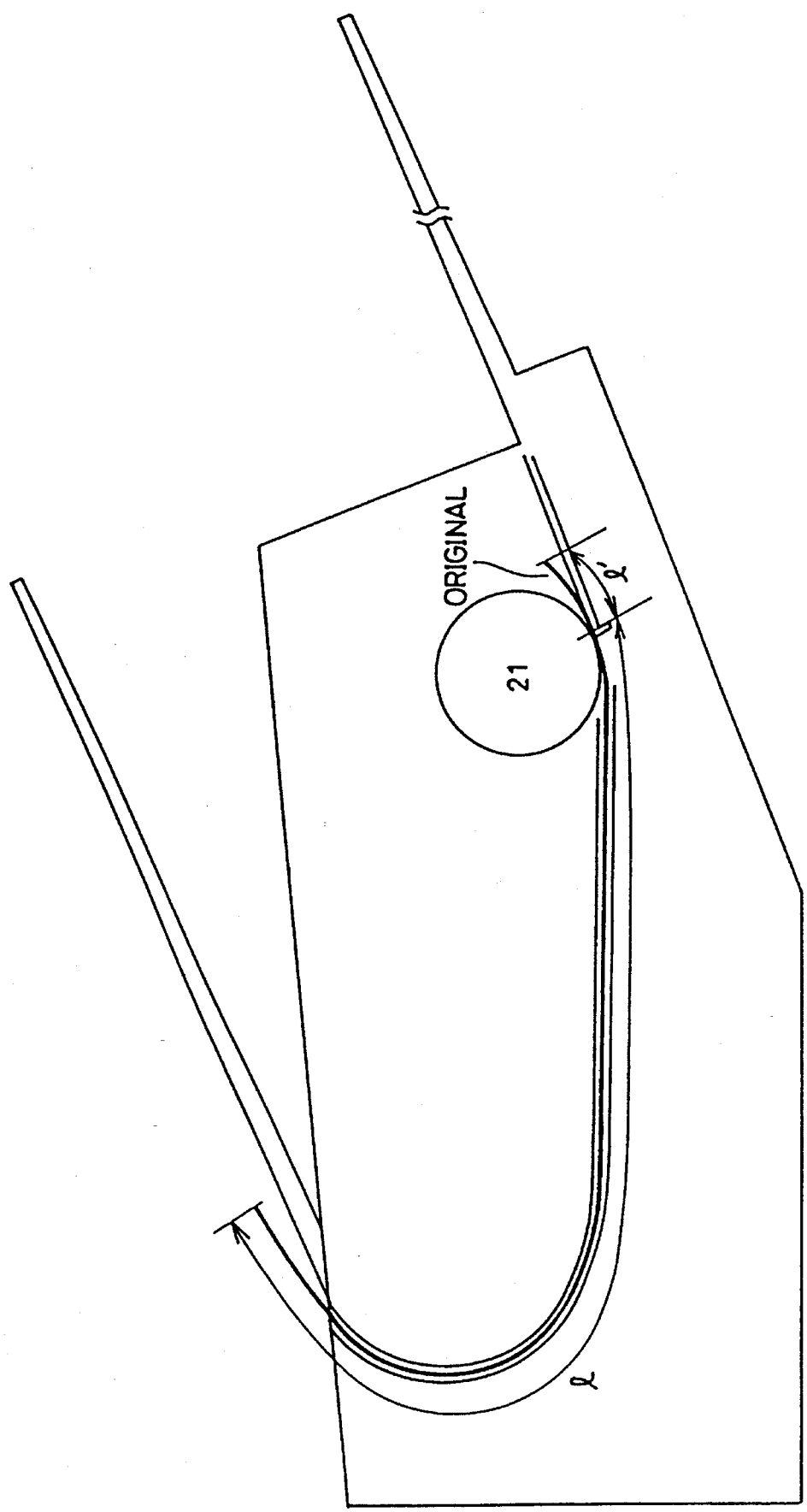
FIG. 14 is a diagram for describing a condition of original transport with respect to a pick-up roller in accordance with the second embodiment of the present invention.

First, a reason why such a process as the second embodiment is required will be described. FIG. 14 is a diagram showing the situation in which an original passes in a paper path of the reader including pick-up roller 21. Referring to FIG. 14, when a rear edge of paper passes pick-up roller 21, the possibility of jam occurrence increases in opposite transport of the paper. This is because the paper must be bitten in the opposite direction with respect to roller 21. Accordingly, in the second embodiment of the present invention, at the point where the rear edge portion of an original is behind roller 21 by l', that is, at the point where the original is fed into roller 21 just by l, the residual quantity of the code memory usable for data storage and the memory quantity necessary for the rear edge portion of the original are compared with each other. Thus, it is predicted before the possibility of jam occurrence increases whether the original must be transported in the opposite direction or not due to the memory over condition. Here, l can be obtained by subtracting l' from the standard original size (297 mm in A4, for example). This value may be obtained by measuring the original length with a sensor or the like. Although the length l and l' are obtained regarding the position of pick-up roller 21 as a reference as shown in FIG. 14 in the present embodiment, the reference may be located at image sensor 24.

Figure 15:
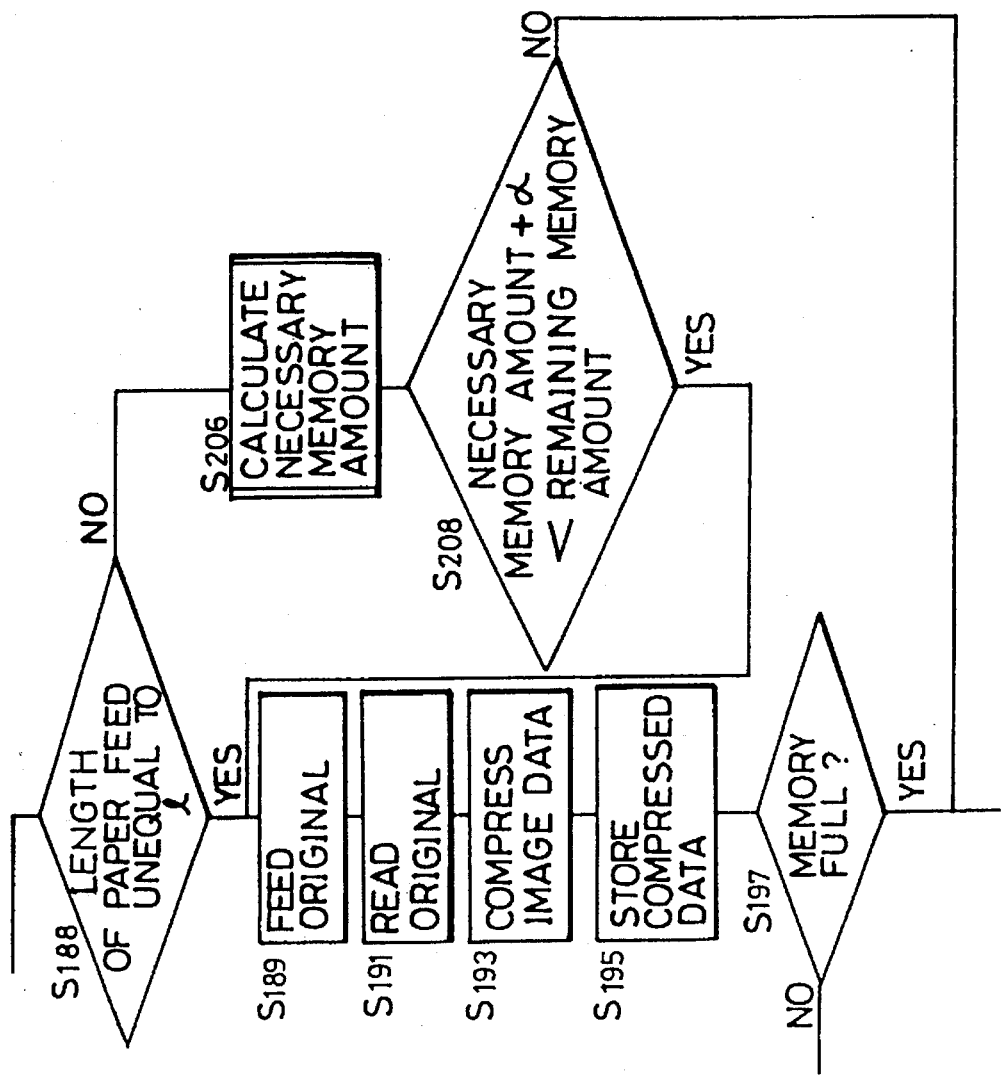
FIG. 15 is a flow chart showing the second embodiment of the present invention.

FIG. 15 is a flow chart showing the second embodiment of the present invention, which corresponds to the portion surrounded by the broken line of FIG. 11B.

Referring to FIG. 15, the flow after S188 will be described. First, in S188, if the quantity of feeding an original is smaller than l, the program directly proceeds to S189. If the length of feed of the original is larger than l in S188, in other words, it is at the timing for predicting the possibility of the memory over condition of the memory, so the program proceeds to S206. In S206, the capacity of the memory required for reading an original is calculated. This calculation will be mentioned later. Then, if it is predicted in S208 that the remaining capacity of the code memory is insufficient by comparing it with the required capacity of the code memory, the program proceeds to S199, where the process for transporting an original in the opposite direction is performed. If it is predicted that the necessary memory capacity will not lack in S208, the program directly proceeds to S189. For checking the remaining capacity of the memory, in S208, not only required memory capacity but also plus something is employed to make this determination leaving a margin.

Figure 16:
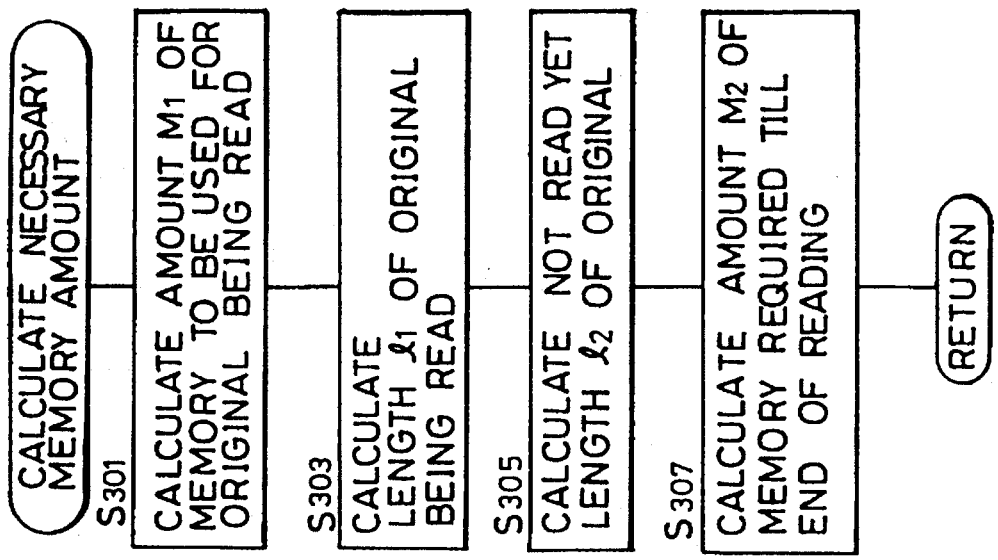
FIG. 16 is a flow chart showing a subroutine for calculating required memory quantity.
Figure 17A:
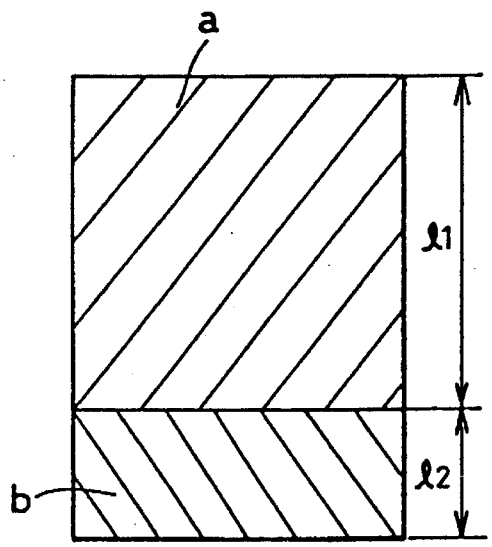
FIGS. 17A and 17B are diagrams showing the relationship between regions of an original and regions of a memory map of a code memory.
Figure 17B:
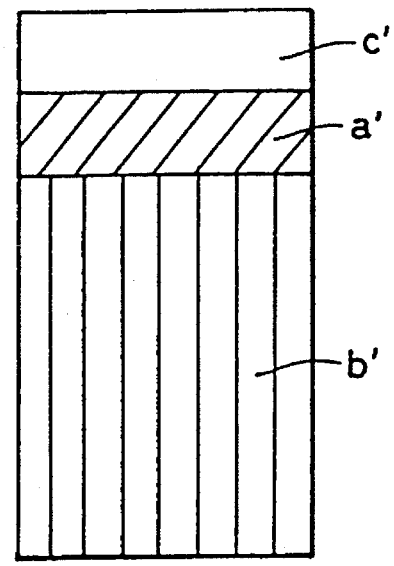

FIG. 16 is a flow chart showing the subroutine for necessary memory capacity calculation shown in S206 of FIG. 15. Before describing the subroutine, referring to FIGS. 17A and 17B, the relationship between regions of an original and map regions of the code memory will be described. FIG. 17A is a schematic diagram showing regions in an original, and FIG. 17B is a diagram showing the memory map of the code memory. Referring to FIG. 17A, when an original is transported toward a reading sensor by 1 as shown in FIG. 14, the portion designated by a of FIG. 17A has been already read and the portion designated by b has not read yet. At that point, the compressed data of the image read is stored in the portion of a' of FIG. 17B. It is presumed that the portion shown by b' of FIG. 17B has been already used for another object, and the portion designated by c' has not been used yet. Under such circumstances, calculation of necessary memory capacity shown in FIG. 16 is performed.

In S301, amount $M_1$ of the memory used for an original being read, or the amount of memory of the portion designated by a' of FIG. 17B is obtained. Next, the original length $l_1$ corresponding to region of an original being read is obtained in S303 as;

$l_1$=1–(the distance between roller 21 and image sensor 24). In S305, the length $l_2$ which corresponds to region of the original not being read yet (refer to FIG. 17A) is obtained by the following expression from the paper size.

$l_2$=(original length)–$l_1$

Next, in S307, the amount $M_2$ of memory needed until the end of reading the original which is being read is predicted as;

$$M_2 = M_1 \cdot (l_2/l_1).$$

The amount $M_2$ of memory needed is predicted in this way. This is based on the assumption that since image is drawn on an original almost evenly, and the compression efficiency does not vary in a sheet of original.

Conversely speaking, the compression efficiency largely varies depending on originals, so that the prediction of the amount of memory to be used is preferably made for each original as shown in the embodiment of the present invention. It is a matter of course that the process of obtaining required capacity can be simplified and M2 may be obtained by the equation such as $l_2$×(original width)×(constant) or $l_2$×(constant), for example. The "constant" is obtained from average compression efficiency of image. If this method is taken, the precision is degraded of the determination of the necessary memory amount and the remaining memory amount in S206.

In the above embodiments, cases have been described in which an image reading apparatus is applied to a facsimile apparatus. It is a matter of course that the present invention can also be applied to an image reading apparatus such as a scanner printer having an image reader equipped with original transporter other than a facsimile apparatus. That is, in the scanner printer it is possible that the transmitted data can not be stored due to the use conditions of a memory of a host, such as a personal computer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:

reading means for sequentially reading a series of a plurality of original images in a reading operation;

storing means for storing at one time image data corresponding to the plurality of original images sequentially read by said reading means;

transmitting means for transmitting said image data stored in said storing means to another device;

detecting means for detecting a lacking condition of storage capacity of said storing means;

controlling means for controlling said reading means to interrupt said reading operation and also for controlling said transmitting means to transmit only image data corresponding to original images which have the entirety of their image data stored in said storing means and to not transmit image data corresponding to an original image which does not have the entirety of its image data stored in said storing means when a lacking condition of storage capacity of said storing means is detected by said detecting means in the course of reading the series of the plurality of original images by said reading means; and restarting means for automatically restarting the interrupted reading operation of said reading means after said transmission of only image data corresponding to original images which have the entirety of their image data stored in said storing means for subsequent reading, by said reading means, of the entire original image which was being read by said reading means when said reading operation was interrupted, and for subsequent transmission, by said transmission means, of the entirety of the image data of the original image which was being read by said reading means when said reading operation was interrupted.

2. The apparatus according to claim 1, wherein the lacking condition of the storage capacity of said storing means detected by said detecting means comprises an absence of said storage capacity.

3. The apparatus according to claim 1, comprising:

saving means for saving an address in said storing means storing said image data of a reading line at which said reading operation is interrupted, wherein said restarting means restarts said reading operation from the reading line at which reading is interrupted, and the image data corresponding to the image read in said restarted reading operation is stored in said storing means on the basis of the address saved by said saving means.

4. An image reading apparatus, comprising:

an original tray capable of carrying a plurality of originals;

a discharge tray capable of receiving a plurality of discharged originals;

a transport path for guiding the originals from said original tray to said discharge tray;

reading means provided at a predetermined position in said transport path for reading original images of said originals in a reading operation;

first transport means for transporting said originals placed on said original tray one by one along said transport path in a direction toward said discharge tray so that said originals pass said reading means;

second transport means for transporting said originals in a direction different from the transport direction of said first transport means;

storing means for storing image data corresponding to the original images of the originals read by said reading means;

transmitting means for transmitting said image data in said storing means to another device;

detecting means for detecting the absence of storage capacity of said storing means;

control means for controlling said reading means to interrupt said reading operation, for controlling said transmitting means to transmit only said image data corresponding to originals with the entirety of their original images stored in said storing means, and for controlling said second transport means to transport said original which was being read, when the absence of storage capacity of said storing means is detected by said detecting means in the course of reading said original image, to a reading starting position of said reading means; and restarting means for automatically restarting the interrupted reading operation by said reading means after said transmission of only said image data corresponding to originals with the entirety of their original images stored in said storing means for subsequent reading, by the reading means, of the entire original image which was being read by said reading means when said reading operation was interrupted, and for subsequent transmission, by the transmission means, of the entirety of the image data of the original image which was being read by said reading means when said reading operation was interrupted.

5. The apparatus according to claim 4, further comprising detecting means for detecting that said original, the reading of which was interrupted, is transported to said reading starting position of said reading means.

6. The apparatus according to claim 5, wherein said detecting means comprises a photoelectric sensor provided in the vicinity of said reading means.

7. An image reading apparatus, comprising:

an original tray capable of carrying a plurality of originals;

a discharge tray capable of receiving a plurality of discharged originals;

a transporting path for guiding originals from said original tray to said discharge tray;

reading means provided at a predetermined position in said transporting path for reading images of said originals in a reading operation;

paper feeding means for feeding said originals placed on said original tray one by one toward said transporting path;

first transporting means for transporting said originals fed by said paper feeding means toward said discharge tray along said transporting path so that said originals pass said reading means:

second transporting means for transporting an original toward said original tray along said transporting path;

storing means for storing image data corresponding to images of said originals read by said reading means;

transmitting means for transmitting said image data in said storing means to another apparatus;

remaining capacity detecting means for detecting remaining storage capacity of said storing means;

size detecting means for detecting a size of said originals;

predicting means for predicting an amount of image data in a portion of an original which has not been read yet from the image data amount in a portion which has been already read of said original;

comparing means for comparing said remaining storage capacity detected by said remaining amount detecting means and storage capacity necessary for storing the image data amount predicted by said predicting means; and controlling means for controlling said reading means to interrupt said reading operation, and for controlling said second transporting means so that an original being read is transported to a reading starting position of said reading means when the remaining storage capacity detected by said remaining capacity detecting means iS smaller than the storage capacity necessary for storing the image data amount predicted by said predicting means as a result of the comparison by said comparing means.

8. The apparatus according to claim 7, further comprising contact means for contacting said original placed on said original tray with said paper feeding means and contact releasing means for releasing the contact of said contact means in response to operation of said second transporting means.

9. The apparatus according to claim 7, further comprising restarting means for automatically restarting reading said image of said original interrupted after said original is transported to said reading starting position by said second transporting means.

* * * * *